United States Patent [19]

König et al.

[11] Patent Number: 4,501,865

[45] Date of Patent: Feb. 26, 1985

[54] POLYMERIZATION PROCESS

[75] Inventors: Joachim König; Carlhans Süling, both of Odenthal; Siegfried Korte, Leverkusen, all of Fed. Rep. of Germany

[73] Assignee: Bayer Aktiengesellschaft, Leverkusen, Fed. Rep. of Germany

[21] Appl. No.: 505,655

[22] Filed: Jun. 20, 1983

[30] Foreign Application Priority Data

Jul. 8, 1982 [DE] Fed. Rep. of Germany ....... 3225521
Oct. 7, 1982 [DE] Fed. Rep. of Germany ....... 3237076

[51] Int. Cl.$^3$ ................................................. C08F 2/16
[52] U.S. Cl. ........................................ 526/71; 526/67; 526/70
[58] Field of Search .............................. 526/67, 70, 71

[56] References Cited

U.S. PATENT DOCUMENTS 2,482,771 9/1949 Heerema ................................ 526/71
4,024,329 5/1977 Lauer ..................................... 526/67
4,232,137 11/1980 Irvin ..................................... 526/71

FOREIGN PATENT DOCUMENTS 231004 10/1958 Australia .

Primary Examiner—Paul R. Michl
Attorney, Agent, or Firm—Sprung, Horn, Kramer & Woods

[57] ABSTRACT

It is possible to remove quantities of heat from exothermically running polymerization reactions of vinyl monomers in heterogeneous phase, in a sophisticated manner by adding liquids to the reaction medium for the removal of heat and to regulate the reaction temperature, which liquids do not dissolve the polymer under the reaction conditions and the boiling temperatures of which are lower than or are identical to the technically predetermined reaction temperatures under the polymerization conditions which are applied, and the heat which is released in the reaction system is removed by evaporating these liquids.

9 Claims, No Drawings

POLYMERIZATION PROCESS

This invention relates to a process for the polymerisation of vinyl monomers in heterogeneous phase with the addition of liquids to regulate the reaction temperature.

Polymerisations in heterogeneous phase are known and are described, for example, in summary form in Houben-Weyl 14/1, Page 133 et seq. The monomer is dissolved or finely divided in a suitable liquid medium, generally in water or in an aqueous system and is polymerised, the polymer being insoluble in water. Advantages of this method are a low viscosity reaction medium and an effective removal of the polymerisation heat.

In bead polymerisation, a water-insoluble monomer is divided by intensive stirring into individual droplets which are additionally stabilized by protective colloids, for example polyvinyl alcohol. The polymerisation is initiated in the droplets by monomer-soluble catalysts.

If, in this method, the formation of regular beads is disturbed, because, for example the polymer is insoluble in the monomer, then this is suspension polymerisation. Suspension and bead polymers may be isolated by filtration at the end of the polymerisation.

Emulsion polymerisation is carried out using water-soluble catalysts in the presence of emulsifiers, for example sodium alkyl sulphate or sodium alkyl sulphonate, the polymer being obtained as latex in a dispersed form.

According to the method of precipitation polymerisation, water-soluble monomers, such as acrylonitrile may be polymerised with water-soluble catalysts, for the most part with redox systems, such as potassium peroxodisulphate/sodium bisulphite. The polymer is insoluble in water and is produced in a granular form, and thus may be filtered.

Polymerisation reactions are exothermic processes in which large quantities of heat have to be removed. These reactions are usually carried out continuously or discontinuously in autoclaves, the reaction heat being removed by cooling the reactor walls. The removal of heat via a cooling jacket of this type is usually ensured to a sufficient extent in the case of relatively small autoclaves and where there are slow conversion rates.

However, attempts are being made for economic reasons to obtain higher yields of polymer. This may be achieved by the use of large reactors up to about 200 m³ reactor volume, or by increasing the conversion rate with a shorter residence time in a smaller reactor. A sufficient removal of heat via the reactor walls is no longer possible in either case, as shown in, for example Advance Chemical Series 128, page 37 (1973), because, for example in the case of large reactors, the ratio of area to volume continuously decreases. In these cases, additional cooling units are necessary to ensure an adequate removal of heat.

Thus, for example it is possible to install cooling coils or cooling pipes in the reactor. These additional fittings are only effective if their cooling area is relatively large compared to the area of the wall. In addition thereto, these cooling pipes influence the intermixing of the reactor and are thus suitable only for low viscosity homogeneous liquids and not for heterogeneous polymerisation reactions in which there is a risk of deposits which, in turn would complicate the heat transition, so that polymers having inhomogeneous parts would be obtained. Moreover, cooling coils and cooling pipes are obstructive during cleaning of the reactor.

Another possibility is to install cooling cylinders and wall scrapers but these are expensive for large reactors and have proved to be susceptible to failure during operation and, for the most part, solve the problem of deposits only for the reactor wall, but not for themselves, i.e., for the wiper blades. In this case too, it is difficult and expensive to clean the reactor and the cooling unit.

It is also possible to pump over the contents of the reactor through externally applied, cooled pipelines. This type of cooling may be designed to be very effective by a correspondingly large lay-out of the cooling units, but it is very expensive if large cooling areas are required. The susceptibility to failure is considerable, because the heterogeneous, active polymerisation medium may readily lead to deposits and congestion in the pipelines and may cause a breakdown of the pumps.

Another method of heat removal is boil-cooling of the reaction medium by evaporating the water which is condensed in a condenser above the reaction vessel and which is re-supplied to the reactor. This process is less suitable for monomers which boil at a lower temperature then water or which form azeotropes with water because, in this case, a considerable amount of the monomer is located in the condenser at elevated temperatures and in a high concentration, which may cause polymer formation (popcorn formation) and deposits in the condenser and which impairs the product quality by specks and fisheyes if such parts pass into the polymerisation medium.

Cooling the metering solutions is another method of heat removal, in which case, cold water or ice may also be pumped into the reactor. However, in addition to a possible undesired dilution of the reaction medium, a high cooling energy and low temperature of the metering solution are necessary in this case to be able to remove adequate quantities of heat, as a result of which the process becomes uneconomic.

An object of the present invention is to provide a process for polymerisation in heterogeneous phase which is capable, even in the case of large reactors and of high conversion rates, of allowing a sufficient removal of heat and a regulation of the reaction temperature in the reaction medium, and which does not have the above-mentioned disadvantages.

It has now been found that it is possible to carry out polymerisation of vinyl monomers in heterogeneous phase by adding one or more liquids to the reaction medium for the removal of heat and in order to regulate the reaction temperature, which liquids do not dissolve the polymer under the reaction conditions, and the boiling temperatures of which are lower than or are equal to the technically pre-determined reaction temperatures under the polymerisation conditions which are applied, and by removing heat which is released in the reaction system by evaporating these liquids.

Therefore, the present invention provides a process for the polymerisation of vinyl monomers in heterogeneous phase, characterised in that one or more liquids are added to the reaction medium for the removal of heat and to regulate the reaction temperature, which liquids do not dissolve the polymer under the reaction conditions, and the boiling temperatures of which are lower than or are equal to the technically pre-determined reaction temperatures under the polymerisation conditions, and heat which is released in the reaction system is removed by evaporating these liquids.

"Polymerisation in heterogeneous phase" is understood in the present context as designating polymerisation reactions, in which the monomer is polymerised, being dissolved or finely divided in a suitable liquid medium, and in which the polymer being insoluble in the reaction medium. Examples of this method include bead polymerisation, suspension polymerisation, emulsion polymerisation and precipitation polymerisation.

All monomers, the homo- or copolymers of which are insoluble in the selected reaction medium are included as vinyl monomers. Examples include styrene, substituted styrenes, such as α-methylstyrene, 4-tert.-butylstyrene or p-chlorostyrene, halogen substituted olefins, such as vinyl chloride, vinylidene chloride or fluorine-substituted olefins, vinyl esters, such as vinyl acetate, vinyl ethers, unsaturated nitriles, such as acrylonitrile or methacrylonitrile, esters and amides of acrylic and methacrylic acid, such as methyl acrylate, acrylic acid butylester or methyl methacrylate, acrylamide, methacrylamide and N-substituted acryl- and methacrylamides, maleic acid anhydride, maleinimide or N-substituted maleinimides, also diolefins, such as butadiene, isoprene or chloroprene.

Preferred embodiments are emulsion polymerisation and bead polymerisation, in an aqueous medium, of esters of acrylic acid and of methacrylic acid on their own or with up to 50% by weight of other comonomers, also emulsion polymerisation or bead polymerisation in an aqueous medium of styrene or substituted styrene on its own or with up to 50% by weight of other comonomers, such as acrylonitrile, acrylate or butadiene, also emulsion polymerisation of diolefins on their own or with up to 50% by weight of other comonomers, such as styrene, acrylonitrile or acrylate, also emulsion polymerisation or suspension polymerisation in an aqueous medium of vinyl chloride on its own or with up to 50% by weight of other comonomers, for example vinylidene chloride, vinyl acetate, acrylonitrile, acrylate, methacrylate and esters and amides of maleic acid and fumaric acid, and finally emulsion polymerisation, bead polymerisation or dispersion polymerisation in an aqueous medium of vinyl esters, such as vinyl acetate, vinyl propionate or vinyl stearate on their own or with up to 50% by weight of other comonomers, such as unsaturated dicarboxylic acids or esters thereof, maleic acid anhydride, maleic acid semiesters, acrylic acid and crotonic acid, vinyl chloride or esters of acrylic acid and methacrylic acid.

Precipiation polymerisation, in an aqueous medium, of acrylonitrile on its own or with up to 50% by weight of other comonomers is particularly preferred, and all ethylenically-unsaturated compounds which are copolymersable with acrylonitrile are suitable as comonomers, such as esters of acrylic acid and methacrylic acid, vinyl esters of aliphatic carboxylic acids, styrene and alkylated styrenes, halogen olefins or maleinimide and N-substituted maleinimides. Vinyl monomers, the homopolymers of which are soluble in the selected reaction medium may also be used as comonomers in quantities up to about 25% by weight, for example acrylic acid, methacrylic acid, N-vinyl pyrrolidone, vinyl pyridines, vinyl sulphonic acid, allyl sulphonic acid, methallyl sulphonic acid, styrene sulphonic acid or 2-acrylamido-2-methylpropane sulphonic acid and salts thereof.

All solvents in which polymerisation is possible in heterogeneous phase and in which the polymer is insoluble are included as a suitable reaction medium for the polymerisation.

Preferred reaction media include water and aqueous systems, for example mixtures of water with suitable miscible solvents. Such solvents include, for example alcohols, such as methanol, ethanol, isopropanol, tert.-butanol, glycol and glycerine, also formamide, dimethylformamide, dimethyl acetamide, dioxane, dimethylsulphoxide, acetone and methylethylketone.

All components which do not dissolve the polymer under the reaction conditions and the boiling temperatures of which are lower than or are identical to the technically predetermined reaction temperatures under the polymerisation conditions which are applied, and which can directly remove, by evaporation, the heat which is released in the reaction system are suitable as a liquid for removing the polmerisation heat and for regulating the polymerisation temperature. Examples of such components include low-boiling hydrocarbons having up to 8 carbon atoms, such as ethane, propane, butane, pentane or hexane; and isomers and mixture of these components, such as low-boiling petroleum ethers; cycloaliphatic and aromatic hydrocarbons, such as benzene or cyclohexane; ethers such as diethylether; esters, such as acetic acid ethyl ester; carbon disulphide; also chloro-, chlorofluoro- or fluoro-substituted hydrocarbons having up to 8 carbon atoms and having boiling points of from $-90°$ to $+90°$ C., for example methyl chloride, methylene chloride, chloroform, carbon tetrachloride, ethyl chloride, trichloroethylene, trichlorofluoromethane, dichlorodifluoromethane, chlorodifluoromethane, trichlorotrifluoroethane, monochloromonofluoroethane, dichlorotrifluoroethane, monochlorodifluoroethane, dichlorotetrafluoroethane, monochlorotetrafluoroethane, difluoroethane, pentafluoroethane and perfluorocyclo octane, and mixture of these components.

Those liquids which are preferred are immiscible with the reaction medium and are selected such that a dissolution of the polymers in these liquids is avoided under the reaction conditions, as a result of which possible undesirable influences on the course of the reaction may be suppressed. Information about solvents and non-solvents for polymers are provided in, for example, J. Brandup and E. H. Immergut, Polymer Handbook, Second Edition IV, page 241 (1975).

The liquid may be selected such that the boiling temperature thereof corresponds to the technically predetermined reaction temperature under the particular polymerisation conditions. If this condition is not fulfilled under normal pressure, then the boiling temperature may easily be adjusted to the required polymerisation temperature by varying the pressure, i.e., by carrying out the polymerisation either under reduced pressure or excess pressure. Of course, mixtures of different liquids may also be used, and an optimum adjustment of the boiling temperature or of the boiling range is possible by a suitable choice of the mixture ratio or by azeotrope formation. By the process according to the present invention, the reaction temperature may be maintained constant, even when the conversion rate and the evolution of heat fluctuate, by the evaporation of more or less liquid, so that an additional temperature regulation is either unnecessary, or is substantially facilitated.

In this case, the quantity of liquid is not critical, as long as there is a minimum quantity which is easy to determine in the reaction vessel. An excess is not detrimental, but it should be kept as low as possible for economic reasons if other reasons do not contradict this. A pressure regulation is generally necessary if no liquid is available, the boiling temperature of which exactly corresponds to the polymerisation temperature under normal pressure.

If a reflux condenser is used, the absolute quantity which is used may be kept at a very low level.

However, the liquid may also be selected such that the boiling temperature thereof is lower than the reaction temperature under the particular polymerisation conditions. In this case, the liquid which is added is immediately evaporated and is practically not in a liquid condition in the reaction mixture. The observance of the required temperature of the reaction mixture is adjusted by means of the metered addition of the liquid. In this case, the condensed liquid is appropriately not returned directly into the reaction vessel (reflux condenser), but is introduced into a supply vessel, from which it is again metered into the reaction vessel via a pump which is regulated by the temperature of the reaction mixture.

The advantage of this variant is that the process may be carried out in principle without pressure, even if the application of excess pressure or reduced pressure is not to be excluded in this variant, and liquids which are more easy to remove during working up (i.e. those with a lower boiling point) may be used in a smaller quantity.

It is also favourable to select the liquid which is used for the heat removal such that the boiling temperature thereof is lower than the boiling temperature of the monomer to be polymerised in order substantially to avoid evaporation of the monomer and to counteract a possible polymerisation in the condenser.

The liquids are added in a quantity such that the total reactor quantity is from 0.005 to 100% by weight, based on the rest of the reaction mixture of, for example water and monomer. The necessary quantity of liquid to be evaporated may easily be calculated by means of a heat balance for the reactor.

Of course, it is possible also to use the conventional heating and cooling units, such as heating and cooling jackets to allow the polymerisation mixture to heat up during the initial stages and to remove further quantities of heat.

If water or aqueous systems are used as the reaction medium for the polymerisation, then inert liquids are preferred which are water-immiscible and which are to be selected such that a dissolution of the polymer in these liquids is avoided.

The following are particularly preferred: low-boiling hydrocarbons, chlorohydrocarbons, chlorofluorohydrocarbons and fluorohydrocarbons, the boiling temperature of which is below the boiling temperature of the monomer to be polymerised and which do not have a regulator effect, or only have a very slight regulator effect during polymerisation.

Fluoro- and chlorofluorohydrocarbons are particularly favourable which, as non-combustible and non-toxic substances are advantageous in handling.

Mixtures of different hydrocarbons, chlorohydrocarbons, chlorofluorohydrocarbons and fluorohydrocarbons may also be used.

The polymers which are produced according to the process of the present invention may be used in conventional areas.

In many cases, it is possible to obtain polymers according to the present process which have improved properties, such as higher molecular weights and improved thermostabilities.

The solution viscosities of the polymers stated in the following Examples were determined at 25° C. in 0.5% dimethylformamide solution. The K values were determined therefrom according to Fikentscher, Cellulosechemie 13 (1932), page 58.

EXAMPLE 1

4.5 kg of deionised water and 50 g of 1-n-sulphuric acid are introduced into a 40 liter polymerisation autoclave which is provided with a blade stirrer and a heating and cooling jacket and which is operated under normal pressure with a reflux condenser (brine cooling at $-10°$ C.). The leftover air is removed by introducing nitrogen, and 800 g of 1,1,2-trichloro-1,2,2-trifluoroethane are added and a pre-run temperature of the cooling water of 51° C. is adjusted. The internal temperature adjusts itself to the boiling temperature of the halogenated hydrocarbon of 47.6° C., and a slight reflux is observed. The following four solutions are pumped in regularly over a period of 5 hours:

Solution 1

39 g of potassium peroxodisulphate in 7.5 kg of deionised water.

Solution 2

120 g of sodium disulphite in 7.5 kg of deionised water.

Solution 3

0.3 g of sodium hexametaphosphate, 0.2 g of aluminium sulphate and 48 g of sodium methallyl sulphonate in 4.5 kg of deionised water.

Solution 4

5.6 kg of acrylonitrile and 354 g of methyl acrylate.

The temperature of the reaction medium may be maintained at 47.6° C. during polymerisation in spite of the pre-run temperature of 51° C. in the cooling jacket, because the reaction heat which is released is remove by the evaporating halogenated hydrocarbon.

The mixture is stirred for 30 minutes at 47.6° C., cooled to room temperature and the resulting polymer suspension is drawn off from the autoclave. The polymer is filtered, washed with deionised water and dried at 50° C. 5 kg of polymer (83.3% yield) are obtained having the following properties:

Nitrogen content: 24.4% by weight $1 \, n\eta_r/C = 1.88$

K value: 101

Extinction of a 10% by weight solution in DMF: $E=0.05$ (450 nm, 2 cm cell)

Extinction of a 10% by weight solution in DMF after a tempering procedure of 6 hours at 75° C.: $E=0.20$ (450 nm, 2 cm cell).

EXAMPLE 2

4.5 kg of deionised water and 50 g of 1-n-sulphuric acid are introduced into a 40 liter polymerisation autoclave which is provided with a blade stirrer, a heating and cooling jacket and a pressure cooler. The left-over air is removed by introducing nitrogen, and 800 g of 1,1,2-trichloro-1,2,2-trifluoroethane are added, the pressure is adjusted to 1.3 bars absolute by means of a pressure retaining valve and a pre-run temperature of the cooling water of 62° C. is previously adjusted. The internal temperature adjusts itself to the boiling temperature of the halogenated hydrocarbon of 55° C. at 1.3 bars absolute, a slight reflux of the halogenated hydrocarbon from the pressure cooler being observed. The following four solutions are pumped in regularly over a period of 5 hours:

Solution 1

39 g of potassium peroxodisulphate in 7.5 kg of deionised water.

Solution 2

120 g of sodium disulphite in 7.5 kg of deionised water.

Solution 3

0.3 g of sodium hexametaphosphate, 0.2 g of aluminium sulphate and 48 g of sodium methallylsulphonate in 4.5 kg of deionised water.

Solution 4

5.6 kg of acrylonitrile, 354 g of methyl acrylate and 800 g of 1,1,2-trichloro-1,2,2-trifluoroethane.

The reaction medium has the required temperature of 55° C. during polymerisation. Without the addition of the halogenated hydrocarbon, the pre-run temperature has to be reduced from 62° to 50° C. in order to maintain the required polymerisation temperature of 55° C.

Working up is carried out according to Example 1. 5.19 kg of polymer are obtained (86.5% yield).

Nitrogen content 24.2% by weight.

$1\, n\eta_r/C = 1.29$

K value = 82

Extinction of a 10% by weight solution in DMF: $E = 0.08$ (450 nm, 2 cm cell)

Extinction of a 10% by weight solution in DMF after a tempering procedure of 6 hours at 75° C.: $E = 0.22$ (450 nm, 2 cm cell).

EXAMPLE 3

330 g of water and 3 g of 1-n-sulphuric acid are introduced into a 3 liter vessel which is provided with a helical stirrer and a distillation bridge. The residual air is expelled by the introduction of nitrogen, and the starting solution is heated to an internal temperature of 55° C.

The temperature in the reaction vessel is maintained at 55° C. by means of a water bath at 56° C. The following solutions are regularly metered in via three dropping funnels over a period of 4 hours:

Solution 1

3.75 g of potassium peroxodisulphate and 3 g of 1-n-sulphuric acid in 587 g of water.

Solution 2

11.4 g of sodium disulphite, 0.015 g of aluminium sulphate, 0.021 g of sodium hexametaphosphate and 5.2 g of sodium methallylsulphonate in 592 g of water.

Solution 3

648 g of acrylonitrile and 40.8 g of methyl acrylate.

After a short initial phase lasting from 5 to 10 minutes, trichlorofluoromethane is metered in through another dropping funnel at a metering rate such that the internal temperature of 55° C. may be maintained constant. In the stationary operating condition, a metering rate of about 15 g/min is then necessary. The trichlorofluoromethane which has been metered in immediately distills off via the distillation bridge, is condensed therein, is collected in a cooled flask and may then be re-supplied to the reaction medium.

After solution 1 to 3 have been metered in, the mixture is then stirred for 30 minutes at 55° C. with the addition of more trichlorofluoromethane, and is then cooled to room temperature. The polymer is filtered, washed with water and dried at 50° C.

626 g of polymer are obtained (yield 90.2%) having the following analytical data:

Nitrogen content: 24.2% by weight

K value: 84

EXAMPLE 4

The following starting solution is contained in a double-walled reactor which is connected to a heating circuit and is equipped with a wall-passable grid stirrer and four metering devices:

1250 g of water, 450 g of acryl polymer, (Composition: 94.3% of acrylonitrile, 5.7% of methyl acrylate, K value 82), 2 g of 1-n-sulphuric acid, 64 g of acrylonitrile, and 4 g of methyl acrylate.

After controlling the temperature at 57° C., polymerisation is started by adding 0.18 of sodium-persulphate and 0.72 g of sodium-disulphite.

Thereafter, solutions I to IV are metered in parallel in the quantities started in the following.

Solution I:

1000 g of water containing 15 g of 1-n-sulphuric acid, 0.5 g of aluminium-sulphate, 3.0 g of sodium-persulphate Metered quantity: 100 g/h.

Solution II:

1000 g of water containing 21.0 g of sodium-disulphate, 5.5 g of sodium-methallylsulphonate Metered quantity: 100 g/h.

Solution III:

855 g of acrylonitrile, 54 g of methyl acrylate, 66 g of trichlorofluoromethane

Metered quantity: 97.5 g/h

Solution IV:

1300 g of trichlorofluoromethane, 175 g of acrylonitrile

Metered quantity: 295 g/h.

Immediately after the beginning of the metering operation, 291 g per hour of the polymer suspension are discharged by means of a pump connected to the bottom seal.

The heating circuit is regulated such that the temperature of the heating medium flowing into the reactor walls conforms with the internal temperature of the reactor of 57° C. The reaction heat which is released during polymerisation is almost compensated, in this method, by the expenditure into energy which is necessary to heat to the reaction temperature the metering solutions, the temperature of which is controlled at 20° C., and to evaporate the quantities of trichlorofluoromethane which are delivered into the system.

The gaseous fluorochlorohydrocarbon flowing out of the reactor is condensed in a condenser together with gaseous parts of the acrylonitrile, and collected in a collecting vessel. About 280 g of condensate having a composition corresponding to metering solution IV are produced per hour. After about 5 hours. i.e., after reaching a conversion-stable condition of polymerisation, the condensate is directly returned into the polymerisation process via the metering IV.

The polymer suspension which is thereafter continuously removed from the reactor and which has a solids content of 27.3% by weight, corresponding to a conversion of 83% still contains, in addition to the residual monomer parts, about 800 ppm of trichlorofluoromethane. After working up the polymer suspension in a conventional manner (by demonomerisation, washing and drying), a pulverulent polymer is obtained:

Composition:
- 94% by weight of acrylonitrile,
- 5.6% by weight of methyl acrylate, and
- 0.4% by weight of sodium-methallylsulphonate.

K value: 82.5

The other chemical and physical properties and the processing behaviour of the acrylic fibre raw material thus obtained correspond to the known quality standard.

We claim:

1. A process for the bead polymerisation or precipitation polymerization of vinyl monomers in heterogeneous aqueous phase comprising adding liquids to the reaction medium for the removal of heat and to regulate the reaction temperature which liquids are chlorohydrocarbon, chlorofluorohydrocarbon or fluorohydrocarbon, are immiscible with the reaction mixture, do not dissolve the polymer under the reaction conditions and the boiling temperatures of which are lower than the technically predetermined reaction temperatures under the polymerization conditions applied, and removing the heat which is released in the reaction system by evaporation of these liquids.

2. A process according to claim 1, comprising using as vinyl monomers: styrene, substituted styrenes, halogen olefins, vinyl esters, vinyl ethers, unsaturated nitriles, esters and amides of acrylic acid and methacrylic acid, maleic acid anhydride, maleinimide, N-substituted maleinimides and diolefins.

3. A process according to claim 1, comprising adding the liquid in a quantity such that the total reactor quantity is from 0.005 to 100% by weight, based on the rest of the reaction mixture.

4. A process according to claim 1, wherein said vinyl monomer is acrylonitrile.

5. A process according to claim 4, wherein said liquid is 1,1,2-trichloro-1,2,2,-trifluoroethane.

6. A process according to claim 4, wherein said liquid is trichlorofluoromethane.

7. A process according to claim 1, wherein said process is carried out without pressure.

8. A process according to claim 7, wherein said process is a bead polymerization.

9. A process according to claim 7, wherein said process is a precipitation polymerisation.

* * * * *